United States Patent [19]

Morisawa et al.

[11] Patent Number: 4,631,983

[45] Date of Patent: Dec. 30, 1986

[54] LEVER MECHANISM FOR CABLE LINKAGE

[75] Inventors: Kunio Morisawa; Yuji Kashihara, both of Toyota; Atsunori Higuchi, Kariya, all of Japan

[73] Assignee: Toyota Jidosha Kabushiki Kaisha, Toyota, Japan

[21] Appl. No.: 756,605

[22] Filed: Jul. 19, 1985

[30] Foreign Application Priority Data

Jul. 19, 1984 [JP] Japan ................ 59-150120

[51] Int. Cl.$^4$ ........................................ B60K 41/04
[52] U.S. Cl. ................ 74/877; 74/501 R; 74/522; 251/294
[58] Field of Search ........... 74/501 R, 522, 865, 74/877; 251/294

[56] References Cited

U.S. PATENT DOCUMENTS

| | | | |
|---|---|---|---|
| 2,764,393 | 9/1956 | Geyer | 251/294 |
| 3,153,349 | 10/1964 | Vandenboss et al. | 74/877 |
| 3,878,738 | 4/1975 | Brooke | 251/294 X |
| 3,884,449 | 5/1975 | Kehm | 251/294 |
| 3,885,770 | 5/1975 | Houk | 251/294 |
| 4,092,876 | 6/1978 | Povejsil | 74/877 |
| 4,320,673 | 3/1982 | Wegert | 74/877 X |
| 4,464,955 | 8/1984 | Martin et al. | 74/877 X |

FOREIGN PATENT DOCUMENTS

| | | | |
|---|---|---|---|
| 3125856 | 1/1983 | Fed. Rep. of Germany | 74/877 |
| 2298740 | 8/1976 | France | 74/877 |
| 605791 | 7/1948 | United Kingdom | 74/522 |
| 2065271 | 6/1981 | United Kingdom | 251/294 |

*Primary Examiner*—Alan Cohan
*Assistant Examiner*—John A. Rivell
*Attorney, Agent, or Firm*—Oblon, Fisher, Spivak, McClelland, & Maier

[57] ABSTRACT

A lever mechanism for a cable linkage includes a control lever mounted on a rotary shaft for rotation therewith, a base plate mounted on the rotary shaft and fixed to the control lever for rotation therewith, and a lever plate adjustably assembled with the base plate and connected at one side of its outer peripheral portion to one end of the cable linkage, the lever plate being provided at its outer peripheral portion with a semicircular guide surface the center of which is located substantially at a rotation fulcrum of the lever plate. The cable linkage is supported on the semicircular guide surface of the lever plate, and the lever plate is displaceable on the base plate during the assembly process thereof to adjust the distance between the semicircular guide surface and the rotation fulcrum.

7 Claims, 4 Drawing Figures

“4,631,983”

LEVER MECHANISM FOR CABLE LINKAGE

BACKGROUND OF THE INVENTION

The present invention relates to a lever mechanism for cable linkages, and more particularly to a lever mechanism for a cable linkage adapted to operate a throttle cam of an automatic transmission in response to movement of a control lever actuated by depression of an accelerator pedal.

In general, such a conventional lever mechanism for cable linkages as described above includes a control lever mounted on a rotary shaft for rotation therewith and operatively connected to an accelerator pedal, an operating lever mounted on the rotary shaft for rotation integral with the control lever, and a cable linkage connected at one end thereof with the operating lever and at the other end thereof with a throttle cam of an automatic transmission, the cable linkage being supported by a semicircular guide surface of the operating lever at its intermediate portion. In operation of the lever mechanism, the control lever is rotated by depression of the accelerator pedal to control an amount of fuel supplied into an internal combustion engine, while the operating lever is rotated integrally with the control lever to rotate the throttle cam through the cable linkage thereby to operate a throttle valve in the automatic transmission. When the lever mechanism is assembled with internal combustion engines, it is required to adjust the initial position and maximum angular position of the control lever for proper adjustment of fuel supply to the respective engines. For this reason, the rotational angle of the operating lever, the stroke amount of the cable linkage, and the rotation amount of the throttle cam each are slightly deviated from a predetermined value due to difference in adjustment of the control lever for the respective engines. This will occur an error in operation of the throttle valve in the automatic transmission.

SUMMARY OF THE INVENTION

It is, therefore, a primary object of the present invention to provide an improved lever mechanism for such a cable linkage as described above, wherein the rotational angle of the operating lever can be adjusted in a simple manner in accordance with adjustment of the control lever for respective engines.

According to the present invention briefly summarized, there is provided a lever mechanism for a cable linkage which includes a control lever mounted on a rotary shaft for rotation therewith, a base plate mounted on the rotary shaft and fixed to the control lever for rotation therewith, and a lever plate adjustably assembled with the base plate and connected at one side of its outer peripheral portion to one end of the cable linkage, the lever plate being provided at its outer peripheral portion with a semicircular guide surface the center of which is located substantially at a rotation fulcrum of the lever plate, and wherein the cable linkage is supported on the semicircular guide surface of the lever plate, and the lever plate is displaceable on the base plate during the assembly process thereof to adjust the distance between the semicircular guide surface and the rotation fulcrum. In the actual practices of the present invention, the control lever is operatively connected to an accelerator pedal to be rotated in accordance with depression stroke of the pedal, and the cable linkage is connected at the other end thereof with a throttle cam of an automatic transmission for an automotive vehicle to operate a throttle valve in the transmission in accordance with depression stroke of the accelerator pedal.

BRIEF DESCRIPTION OF THE DRAWINGS

Additional objects, features and advantages of the present invention will become readily apparent from the following detailed description of a preferred embodiment thereof when considered with reference to the accompanying drawings, in which.

DETAILED DESCRIPTION OF THE PREFERRED EMBODIMENT

Figure 1:
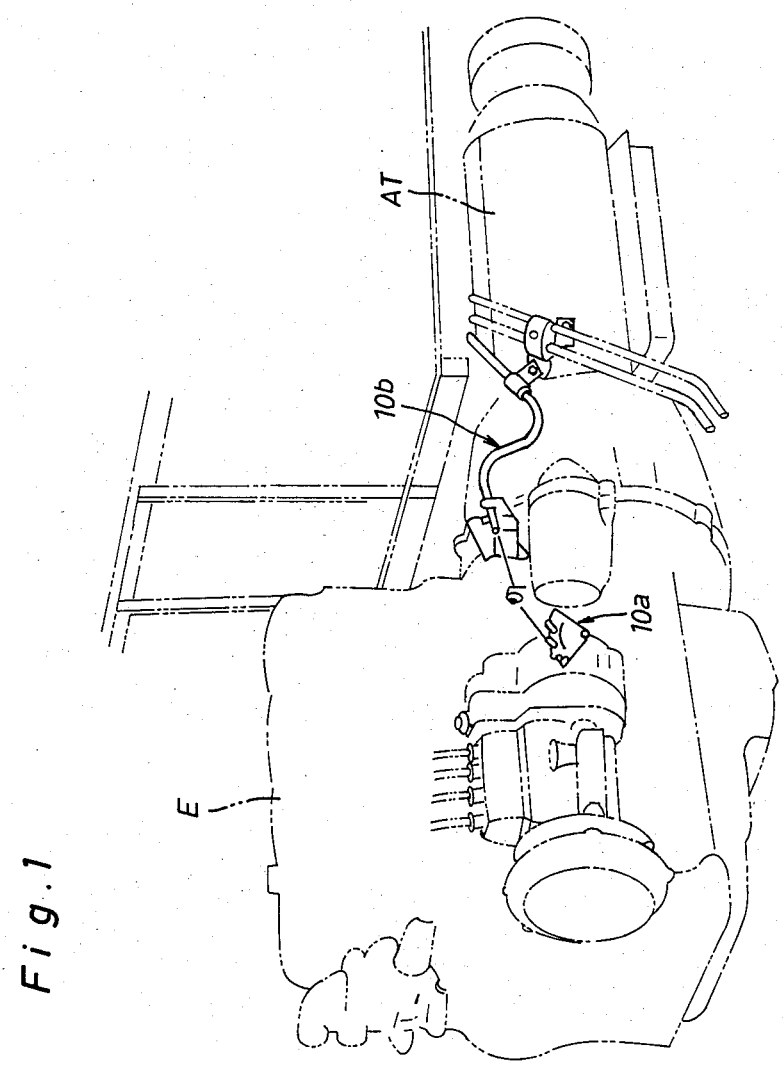
FIG. 1 is a schematic illustration of an arrangement of a lever mechanism for a throttle cable linkage in accordance with the present invention.
Figure 2:
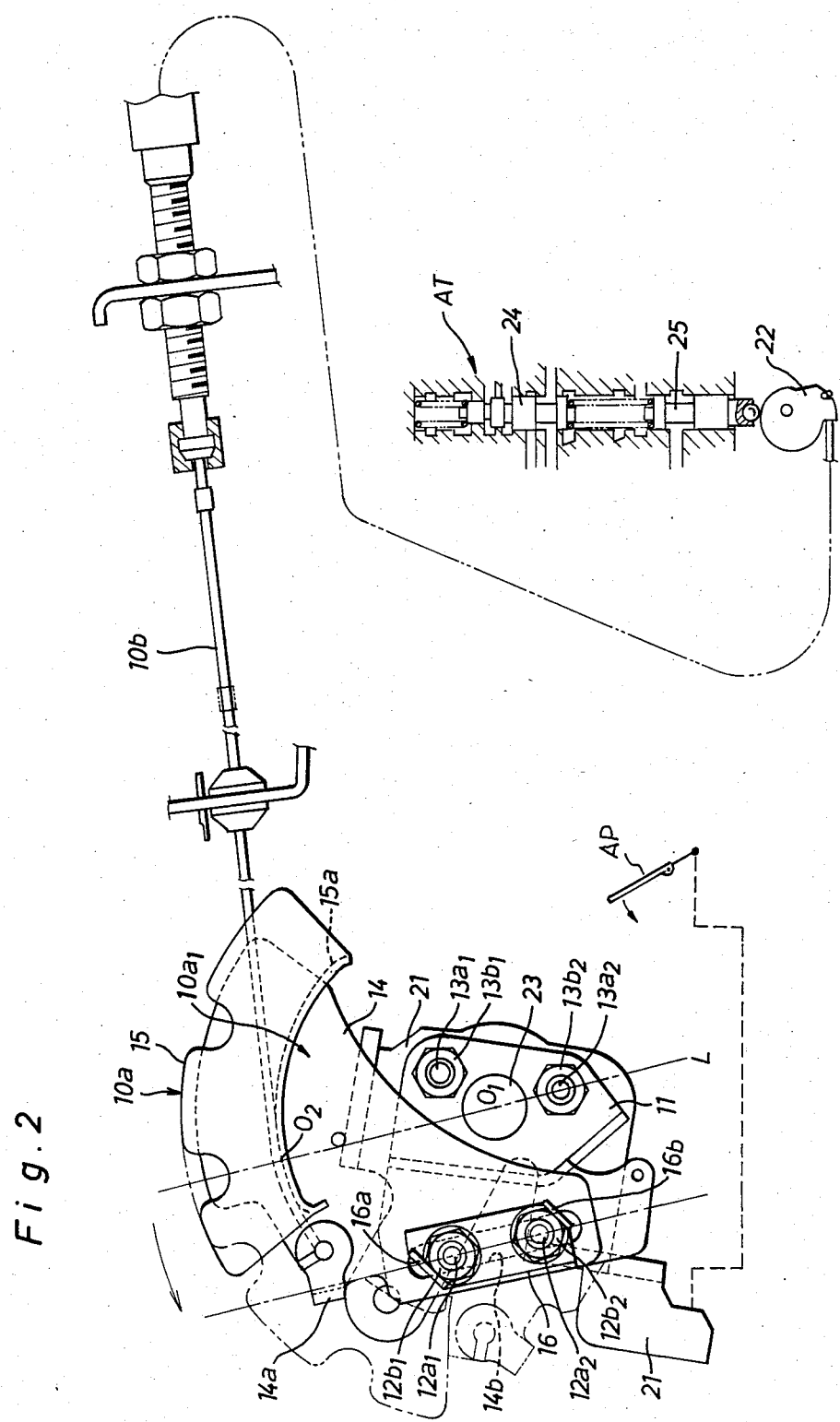
FIG. 2 is a front view of the lever mechanism shown in FIG. 1, which schematically illustrates a throttle cable connected to a throttle cam of an automatic transmission.

Referring now the drawings, in FIGS. 1 and 2, there is schematically illusrated an arrangement of a lever mechanism $10a$ for a throttle cable linkage $10b$ in accordance with the present invention, which is mounted on a side portion of a fuel injection pump for a Diesel engine E to effect rotation of a throttle cam 22 of an automatic transmission AT in response to depression of an accelerator pedal (not shown). The lever mechanism $10a$ includes a control lever 21 mounted on a rotary shaft 23 for rotation therewith, and an operating lever assembly $10a_1$ integrally assembled with the control lever 21 as will be described in detail later. The throttle cable linkage $10b$ is connected at one end thereof to the operating lever assembly $10a_1$ and at the other end thereof to the throttle cam 22 to effect rotation of the throttle cam 22 in accordance with rotation of the control lever 21. The control lever 21 is operatively connected to the accelerator pedal AP to effect rotation of the rotary shaft 23 in accordance with depression of the accelerator pedal. The rotary shaft 23 is arranged to control an amount of fuel injection from the pump P and to control an amount of intake air of the engine E. The throttle cam 22 is arranged to move a throttle valve 24 through a down-shift plug 25 in accordance with rotation of the operating lever assembly $10a_1$. Thus, the throttle valve 24 acts to produce a throttle pressure in accordance with output of the engine E.

Figure 3:
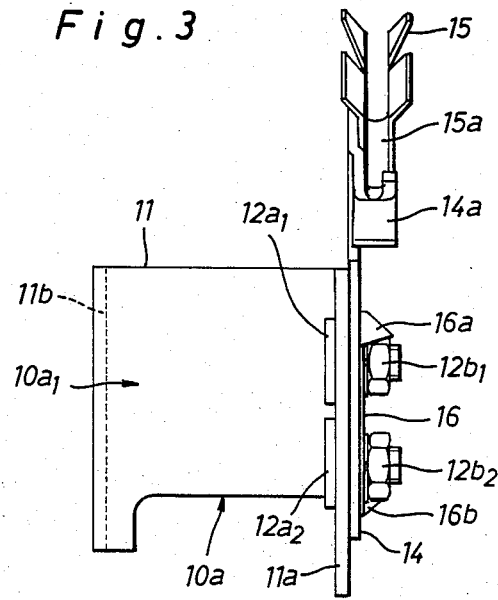
FIG. 3 is a side view of an operating lever assembly removed from the lever mechanism shown in FIG. 2.
Figure 4:
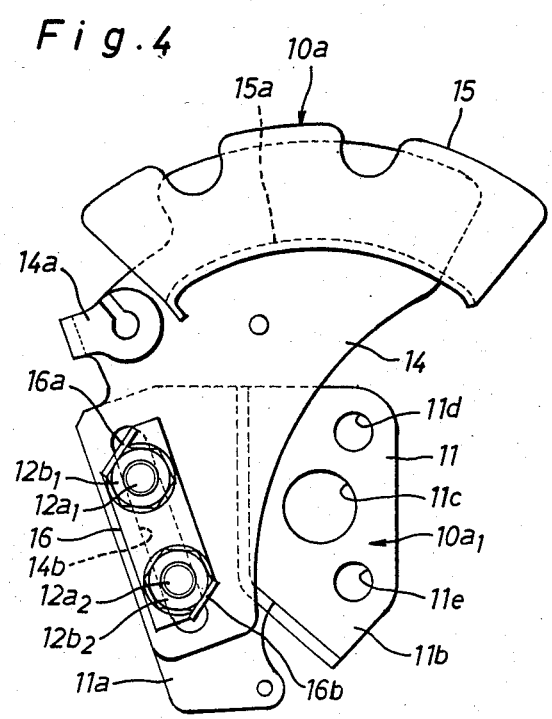
FIG. 4 is a front view of the operating lever assembly shown in FIG. 3.

As is illustrated in FIGS. 2–4, the operating lever assembly $10a_1$ comprises a base plate 11 fixed to the control lever 21, and a lever plate 14 adjustably fixed to the base plate 11. As is illustrated in FIGS. 3 and 4, the base plate 11 is bent to form first and second plate portions $11a$ and $11b$ which are spaced in parallel to each other. The first plate portion $11a$ of base plate 11 is provided with two spaced bolts $12a_1$ and $12a_2$ welded thereto. The second plate portion $11b$ base plate 11 is formed with a through hole $11c$ in which the rotary shaft 23 is arranged and is formed with a pair of spaced mounting holes $11d$ and $11e$. Thus, as is illustrated in FIG. 1, the base plate 11 is integrally assembled with the control lever 21 at its second plate portion $11b$ by means of bolts $13a_1$, $13a_2$ nuts $13b_1$, $13b_2$ fastened thereto.

As is illustrated in FIG. 4, the lever plate 14 is in the form of a sector-shaped plate which is integrally provided at the outer peripheral portion thereof with a guide member 15 of a U-shaped cross-section. The guide member 15 is formed therin with a semicircular groove the bottom of which is formed as a semicircular guide surface 15a. The sector-shaped lever plate 14 is formed with a hook 14a which is located at the left side of guide member 15 to retain one end of the throttle cable linkage 10b. The sector-shaped lever plate 14 is further formed at the lower portion thereof with an elongated slot 14b which receives therein the bolts $12a_1$ and $12a_2$ of base plate 11. During the assembly process, the sector-shaped lever plate 14 is overlapped with the first plate portion 11a of base plate 11 in such a manner that both the bolts $12a_1$ and $12a_2$ of base plate 11 are inserted into the elongated slot 14b of lever plate 14. At this stage, the lever plate 14 can be displaced along the spaced bolts $12a_1$ and $12a_2$ to determine a relative position to the base plate 11. Thereafter, the lever plate 14 is fixed in place by a pair of nuts $12b_1$ and $12b_2$ fastened to the spaced bolts $12a_1$ and $12a_2$ through a lock plate 16. The lock plate 16 is bent upward at its opposed corners 16a, 16b to prevent loosening of the fastened nuts $12b_1$ and $12b_2$. In the lever mechanism 10a mounted in such a manner as described above, the center of the semicircular guide surface 15a is located substantially at the rotation fulcrum $O_1$ of the operating lever assembly $10a_1$, and the elongated hole 14b of lever plate 14 is arranged substantially in parallel with a line L between the rotation fulcrum $O_1$ and the center $O_2$ of an engaged portion of cable 10b with the semicircular guide surface 15a under inoperative condition of the operating lever assembly $10a_1$.

In operation, the control lever 21 is rotated in accordance with depression stroke of the accelerator pedal to effect counterclockwise rotation of the operating lever assembly $10a_1$ so as to rotate the throttle cam 22 through the cable linkage 10b. As a result, the throttle valve 24 in the automatic transmission is operated in accordance with the rotational angle of throttle cam 22 to produce a throttle pressure responsive to the output of the engine. In the case that the initial position of the control lever 21 has been adjusted for proper adjustment of fuel supply to the engine, it is required to adjust the rotational angle of the operating lever assembly $10a_1$ in accordance with adjustment of the control lever 21 for proper operation of the throttle valve 24. In such a requirement for adjtument of the operating lever assembly $10a_1$, the sector-shaped lever plate 14 is displaced along the spaced bolts $12a_1$, $12a_2$ during the above-described assembly process in order to increase or decrease the distance between the rotation fulcrum $O_1$ and the semicircular guide surface 15a for adjustment of the stroke amount of the throttle cable linkage 10b in relation to the rotational angle of the operating lever assembly $10a_1$. Thus, the stroke amount of the throttle cable linkage 10b can be adjusted in relation to adjustment of the rotational angle of control lever 21 to ensure proper operation of the throttle valve 24.

Although a certain specific embodiment of the present invention has been shown and described above, it is obvious that many modifications and variations thereof are possible in light of these teachings. It is to be understood, therefore, that within the scope of the appended claims, the invention may be practiced otherwise than as specifically described herein.

What is claimed is:

1. A lever mechanism for a cable linkage including a control lever mounted on a rotary shaft for rotation therewith, a base plate mounted on said rotary shaft and fixed to said control lever for rotation therewith, and a lever plate adjustably mounted at two points thereof on said base plate and being connected at one side of its outer peripheral portion to one end of said cable linkage, said lever plate being provided at its outer peripheral portion with a semicircular guide surface having a center of curvature located substantially at a rotation fulcrum of said lever plate, wherein said cable linkage is supported on the semicircular guide surface of said lever plate, and said lever plate is displaceable on said base plate during the assembly process thereof to adjust the distance between the semicircular guide surface and the rotation fulcrum.

2. A lever mechanism for a cable linkage as claimed in claim 1, wherein said control lever is operatively connected to an accelerator pedal to be rotated in accordance with depression stroke of said accelerator pedal, and said cable linkage is connected at the other end thereof with a throttle cam of an automatic transmission to operate a throttle valve in said transmission in accordance with depression stroke of said accelerator pedal.

3. A lever mechanism for a cable linkage as claimed in claim 1, wherein said base plate has first and second plate portions spaced in parallel to each other, the first plate portion being arranged to support said lever plate thereon, and the second plate portion being fixed to said control lever, and wherein said lever plate is in the form of a sector-shaped plate adjustably fixed to the first plate portion of said base plate.

4. A lever mechanism for a cable linkage as claimed in claim 3, wherein said sector-shaped plate is integrally provided with a semicircular guide member of a U-shaped cross-section secured to the outer peripheral portion thereof, and wherein said cable linkage is supported on a semicircular guide surface formed by the bottom of said guide member.

5. A lever mechanism for a cable linkage including a control lever mounted on a rotary shaft for rotation therewith, a base plate mounted on said rotary shaft and fixed to said control lever for rotation therewith, and a lever plate adjustably assembled with said base plate and connected at one side of its outer peripheral portion to one end of said cable linkage, said lever plate being provided at its outer peripheral portion with a semicircular guide surface having a center of curvature located substantially at a rotation fulcrum of said lever plate, wherein said cable linkage is supported on the semicircular guide surface of said lever plate, and said lever plate is displaceable on said base plate during the assembly process thereof to adjust the distance between the semicircular guide surface and the rotation fulcrum, wherein said base plate has first and second plate portions spaced in parallel to each other, the first plate portion being arranged to support said lever plate thereon, and the second plate portion being fixed to said control lever, and wherein said lever plate is in the form of a sector-shaped plate adjustably fixed to the first plate portion of said base plate.

6. A lever mechanism for cable linkage as claimed in claim 5, wherein said sector-shaped plate is integrally provided with a semicircular guide member of a U-shaped cross-section secured to the outer peripheral portion therof, and wherein said cable linkage is supported on a semicircular guide surface formed by the bottom of said guide member.

7. A lever mechanism for a cable linkage as claimed in claim 5, wherein said control lever is operatively connected to an accelerator pedal to be rotated in accordance with a depression stroke of said accelerator pedal, and said cable linkage is connected at the other end thereof with a throttle cam of an automatic transmission to operate a throttle valve in said transmission in accordance with a depression stoke of said accelerator pedal.

* * * * *